(12) United States Patent
Xue

(10) Patent No.: US 7,698,259 B2
(45) Date of Patent: Apr. 13, 2010

(54) SEMANTIC SEARCH IN A DATABASE

(75) Inventor: Jianmin Xue, Shanghai (CN)

(73) Assignee: SAP AG, Walldorf (DE)

( * ) Notice: Subject to any disclaimer, the term of this patent is extended or adjusted under 35 U.S.C. 154(b) by 216 days.

(21) Appl. No.: 11/604,123

(22) Filed: Nov. 22, 2006

(65) Prior Publication Data

US 2008/0120279 A1    May 22, 2008

(51) Int. Cl.
*G06F 17/30* (2006.01)
(52) U.S. Cl. .................. 707/3; 707/5; 707/6; 707/7; 707/104.1
(58) Field of Classification Search ............. 707/1–7, 707/104.1; 705/26, 29
See application file for complete search history.

(56) References Cited

U.S. PATENT DOCUMENTS

| | | | | |
|---|---|---|---|---|
| 5,809,297 | A * | 9/1998 | Kroenke et al. ............. | 707/102 |
| 6,751,621 | B1 * | 6/2004 | Calistri-Yeh et al. ........ | 707/100 |
| 6,766,320 | B1 * | 7/2004 | Wang et al. .................... | 707/5 |
| 7,299,247 | B2 * | 11/2007 | Calistri-Yeh et al. ..... | 707/104.1 |
| 7,349,895 | B2 * | 3/2008 | Liu et al. ........................ | 707/3 |
| 7,499,910 | B2 * | 3/2009 | Schneider et al. .............. | 707/3 |
| 2004/0194141 | A1 * | 9/2004 | Sanders ........................ | 725/53 |
| 2004/0230572 | A1 * | 11/2004 | Omoigui ........................ | 707/3 |
| 2005/0154723 | A1 * | 7/2005 | Liang ............................ | 707/3 |
| 2005/0160107 | A1 * | 7/2005 | Liang ............................ | 707/100 |
| 2006/0047632 | A1 * | 3/2006 | Zhang ............................ | 707/3 |
| 2006/0179041 | A1 * | 8/2006 | Ohi et al. ........................ | 707/3 |
| 2006/0184516 | A1 * | 8/2006 | Ellis ............................... | 707/3 |
| 2007/0112763 | A1 * | 5/2007 | Broder et al. ................... | 707/5 |
| 2007/0136251 | A1 * | 6/2007 | Colledge et al. ............... | 707/3 |
| 2007/0233692 | A1 * | 10/2007 | Lisa et al. ...................... | 707/10 |
| 2008/0005651 | A1 * | 1/2008 | Grefenstette et al. ......... | 715/500 |
| 2008/0040329 | A1 * | 2/2008 | Cussen et al. .................. | 707/3 |
| 2008/0082494 | A1 * | 4/2008 | Polo-Malouvier et al. ...... | 707/3 |

* cited by examiner

*Primary Examiner*—Don Wong
*Assistant Examiner*—Hanh B Thai
(74) *Attorney, Agent, or Firm*—Blakely Sokoloff Taylor & Zafman LLP

(57) ABSTRACT

A search system performs a search in a database. In one embodiment, a process of the search system includes, but is not limited to, in response to a request to search a search term in the database, performing the search in the database based on semantics relationships of the search term and an entity in view of one or more transactions associated with the entity, and presenting a search result of the search, the search result including one or more documents associated with the one or more transactions.

14 Claims, 10 Drawing Sheets

SEMANTIC SEARCH IN A DATABASE

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to database searches. More particularly, this invention relates to a semantic search in a database.

BACKGROUND

Enterprise software is generally used to manage the inventory, transactions, customer relationship, manufacturing, purchases, sales, services, and finance of a business. Enterprise software often stores business data in a business database, e.g., a company's proprietary database. To obtain information from the database, a user often conducts a search in the database.

Conventional business databases often store information based on a pre-determined classification of the information. If a user's search term is not in one of the pre-determined classifications, either no result will be produced at all, or a result will be produced after several search steps. For example, FIG. 1 shows the operations of a command center 150 of a conventional business database. In FIG. 1, an end user wishes to obtain the stock status of a product item A0001 purchased from vendor V0001. In operation 11, the user first locates "Stock Status" from a menu provided by a user interface of command center 150. In operation 12, the user clicks on the "Stock Status" in a menu. In response to the clicking, in operation 13, command center 150 opens a display window in the user interface to provide a plurality of selection criteria. In operation 14, the user enters product item code "A0001" to specify the product of interest. In operation 15, the user enters supplier code "V0001" to specify the vendor of interest. In operation 16, the user clicks on an "OK" button to run report. In operation 18, command center 150 generates a stock status report. In operation 19, the user prints the report. In operation 20, the user finishes the task and closes the search program.

In the above example, multiple user operations are typically needed in order for the command center to gather all the information necessary for the report. Thus, the conventional database search tool is generally inefficient for business purposes. Moreover, the information necessary for the report is often stored under several different directories in different locations. Thus, the search and retrieval of the information are also inefficient for business purposes.

SUMMARY OF THE DESCRIPTION

A search system performs a search in a database. In one embodiment, a process of the search system includes, but is not limited to, in response to a request to search a search term in the database, performing the search in the database based on semantics relationships of the search term and an entity in view of one or more transactions associated with the entity, and presenting a search result of the search, the search result including one or more documents associated with the one or more transactions.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Semantic search in a database is described herein. In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

A database (e.g., an enterprise information system) is coupled to a search system to allow a user to locate information in the database. The search system presents to the user consolidated search results that are semantically related to the search terms entered by the user. The search system also presents action advices to guide the user's actions subsequent to the search. The action advices, when activated, trigger defined actions to produce results for the user using the information in the database. As a result, the search system generally increases the efficiency of the search in a business database.

Such a search system may be used with enterprise software, e.g., SAP Business One, a product of SAP AG in Germany, to help a business to manage its inventory, accounting, finance, customer relationship, and other business activities. However, it is understood that the search system may be utilized by any proprietary or non-proprietary application software to provide data management.

Figure 1:
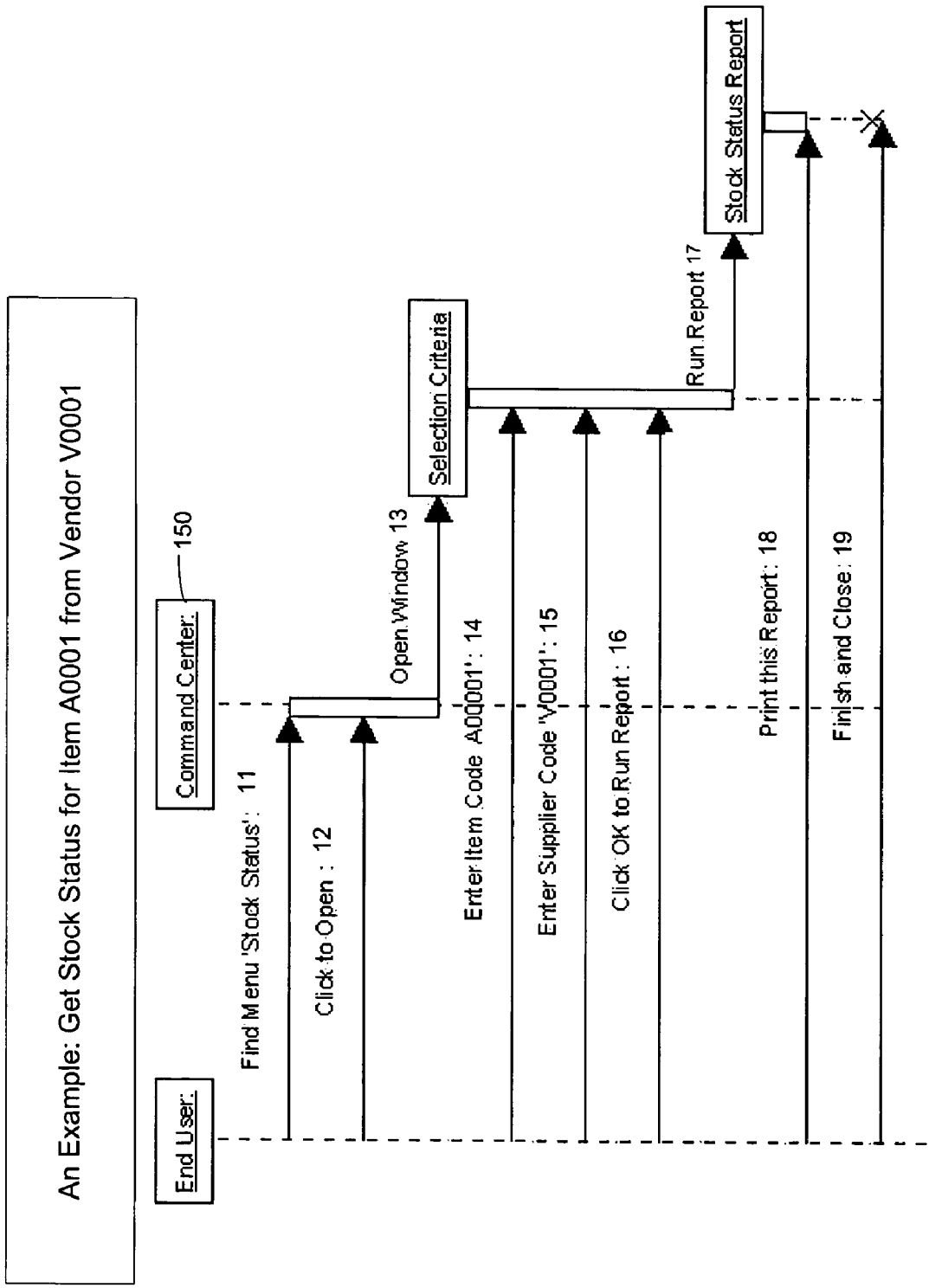
FIG. 1 is a diagram illustrating a conventional search model.
Figure 2:
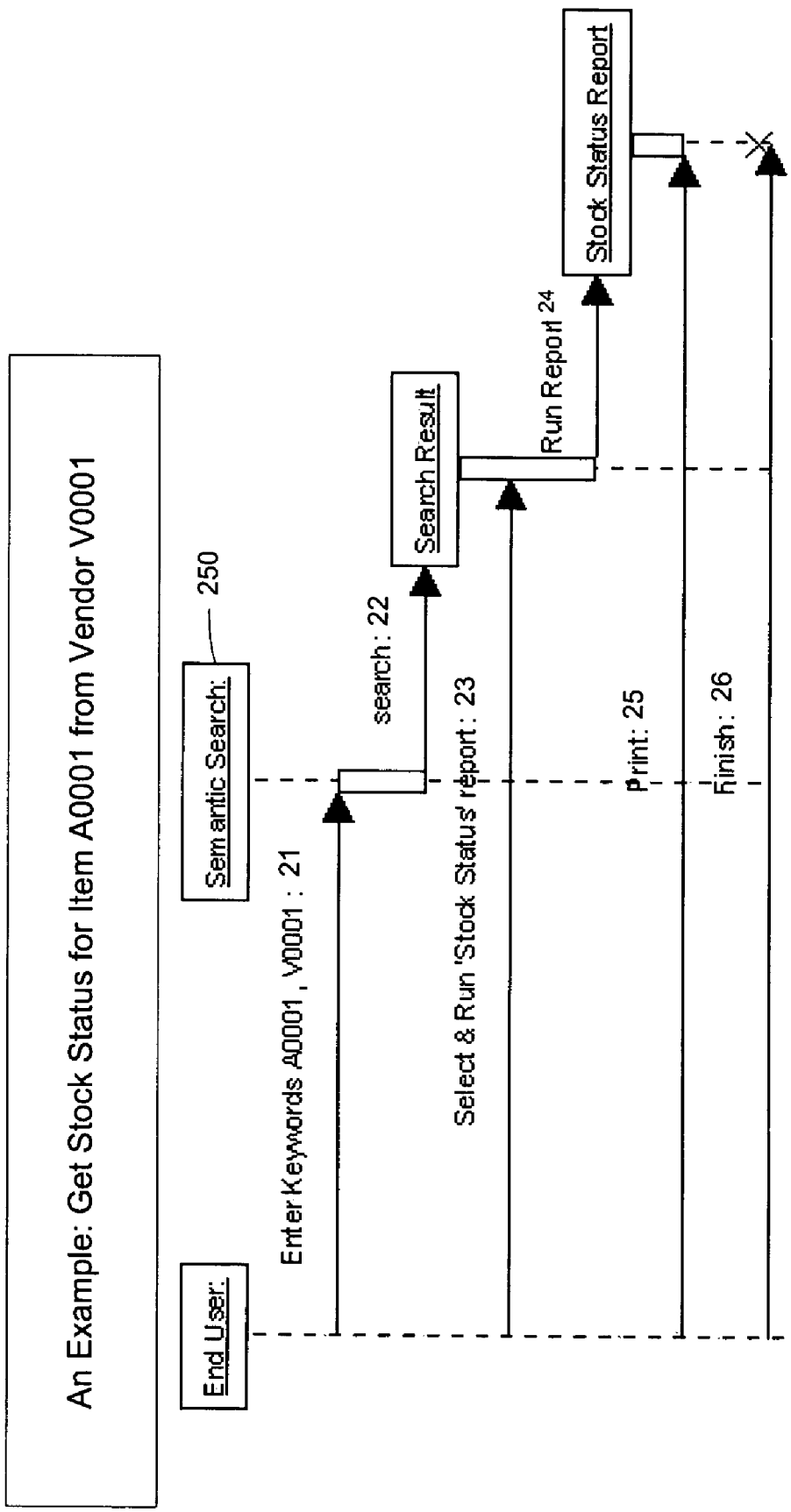
FIG. 2 is a diagram illustrating a semantic search according to one embodiment of the invention.

FIG. 2 shows an example in which an end user wishes to generate a stock status report for product item A0001 purchased from vendor V0001. In operation 21, the user submits a search request including keywords A0001 and V0001. In operation 22, a semantic search engine 250 retrieves all the information semantically relating to product item A0001 and vendor V0001 from a semantic search database, which is to be described later, and generates a search result. Accompanying the search result are action advices, which indicates the actions that a user may take with respect to the search result. In response to the search result and the action advices, in operation 23, the user selects the action of generating a stock status report. In operation 24, a stock status report is generated. The user prints the report in operation 25 and finishes the task in operation 26. Thus, in this example, to generate a stock status report, the user only needs to provide the search system with two keywords and select an action presented by the system. The above user operations are shown for illustration purposes only and different or additional operations may be performed.

Figure 3:
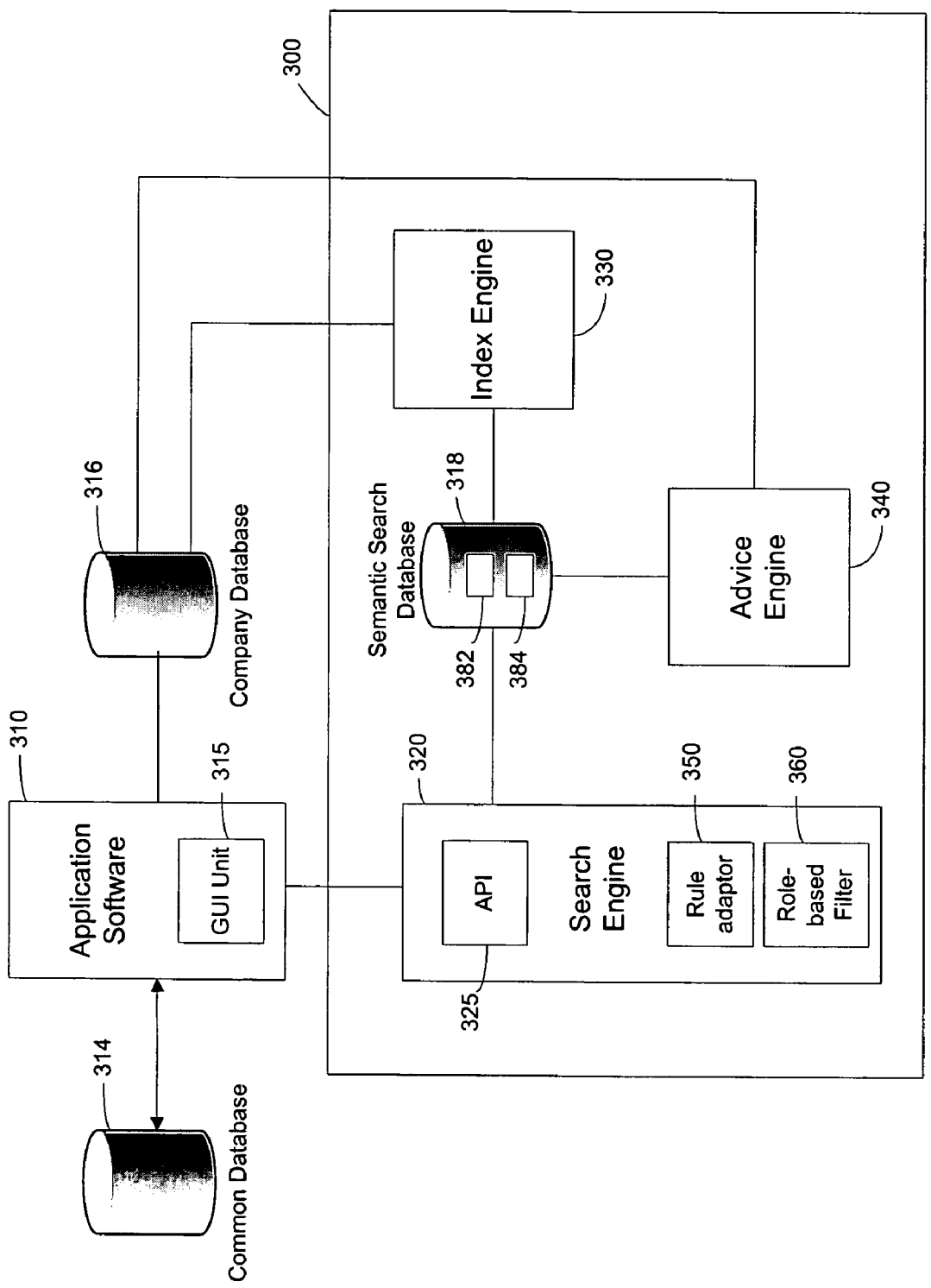
FIG. 3 is a block diagram illustrating a semantic search system according to one embodiment of the invention.

FIG. 3 is a block diagram illustrating an embodiment of a search system 300 for conducting a search, such as the search in FIG. 2. Referring to FIG. 3, search system 300 is coupled to application software 310 and has an access to a company database 316. Application software 310 has an access to one or more databases, e.g., a common database 314, the company database 316, and other suitable proprietary or non-proprietary databases. These databases 314 and 316 may be accessible over the Internet, an intra-enterprise network, a local area network, a wide area network, or any suitable networks. Common database 314 may be any database that is accessible to the public, e.g., a web-based public database. Company database 316 stores business information of an enterprise. The business information includes, but is not limited to, business transaction records, products and parties relating to the business transactions, and finance and accounting information relating to the business transactions.

Search system 300 includes a search engine 320 to perform a semantic search at the request of a user of application software 310. Search engine 320 generates search results according to the semantics, or equivalently, the meanings of a search term. Thus, search engine 320 does not simply match a search text string with the text strings in the database. Rather, search engine 320 interprets the meaning of a search term and searches for the terms in the database that have related meanings. In one embodiment, in response to a request to search a search term, search engine 320 performs a search in the database based on semantics relationships of the search term and an entity in view of one or more transactions associated with the entity. For example, a user may enter search term "V0001" which is an identifier of a vendor. Based on the search term "V0001" and the "vendor" entity, search engine 320 retrieves transactions relating to V0001 and information relating to the "vendor" entity. Information relating to the "vendor" entity includes, for example, inventory level from a vendor and last price quoted by a vendor. The information may be used as action advices as will be described in more detail below.

Application software 310 includes an interface (e.g., graphical user interface (GUI) unit 315) coupled to an application interface 325 in search engine 320. GUI unit 315 receives search requests from the user and triggers search operations via application interface 325. Application interface 325 may be adapted to operate with different types of application software 310.

System 300 further includes an index engine 330 to index the data items in company database 316 and to store the indexed results into a semantic search database 318, also referred as an indexed database 318. Search engine 320 performs searches in indexed database 318 to increase the search speed and efficiency. An advice engine 340 in system 300 generates action advices based on the data in company database 316. Each action advice, when activated, generates an action using the information in the company database 316. Each action advice is specifically defined for an entity category associated with a user's search term. For example, a product item and a warehouse are typically considered as two different entity categories. Thus, using a product item as a search term generally triggers different action advices from using a warehouse as a search term. Action advices further include document action advices which, when activated, generate document actions relating to processing and production of business documents. Each document action advice is specifically defined for a relationship category associated with the search terms. For example, an invoice and a receipt are typically considered as two different relationship categories. Thus, the document action advices for an invoice are generally different from the document action advices for a receipt. The term "relationship" is used because an invoice (a receipt or similar documents) is defined by the relationship of at least two entities. It is to be understood that in some scenarios, different entity or relationship categories may have the same action/document action advices. However, these action advices in different categories can be independently defined and updated as search system 300 evolves and may become different in any point of the life of the system.

Indexed database 318 includes a first storage 382 that stores a first set of rules for index engine 330 and a second storage 384 that stores a second set of rules for advice engine 340. Each of the first and second set of rules includes predefined rules and adaptive rules. The pre-defined rules are defined and stored before any searches are conducted by search engine 320. The adaptive rules are learned from the searches conducted by search engine 320 in response to a user's search requests. A rule adaptor 350 in search engine 320 develops the adaptive rules according to the search terms entered by the users and the results generated by the search engine.

In one embodiment, search engine 320 also includes a role-based filter 360 for access control. That is, information in company database 316 is classified and a user is allowed to access the class of information for which he/she has a privilege. After search engine 320 retrieves search results but before the results are displayed, filer 360 processes the results and blocks the display of those results for which the user does not have a privilege. The components of system 300 are shown for illustration purposes only and other configurations may exist. Note that some or all of the components or modules as shown in FIG. 3 may be implemented in software, hardware, or a combination of both.

Figure 4:
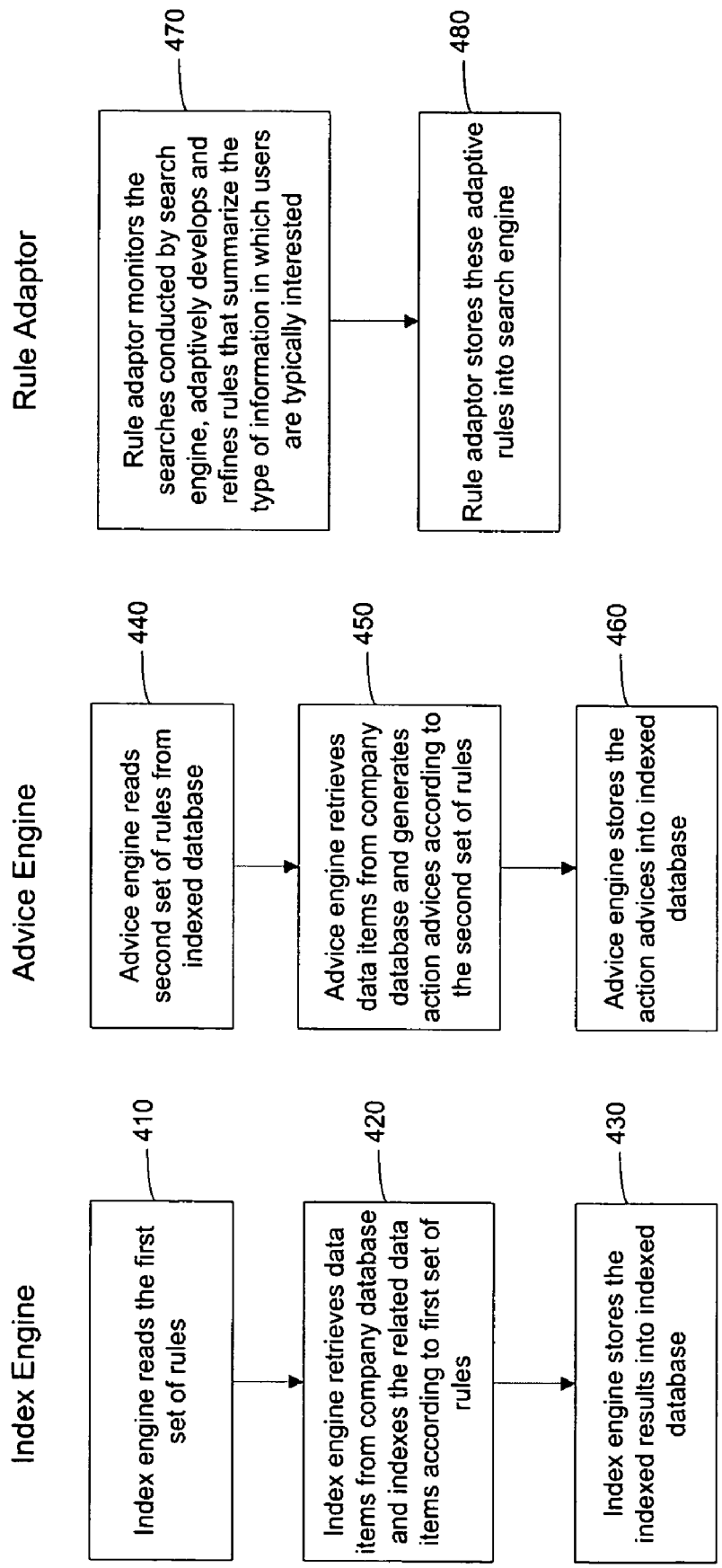
FIG. 4 is a flowchart illustrating an example of an operation performed by the semantic search system.

FIG. 4 is a flowchart illustrating an embodiment of operations performed by a search system, e.g., system 300 of FIG. 3. Note that processes as shown in FIG. 4 may be performed by processing logic which may include software, hardware, or a combination of both. At block 410, index engine 330 reads the first set of rules from first storage 382. At block 420, index engine 330 retrieves data from company database 316 and indexes related data items according to the first set of rules. The first set of rules defines the types of data items that are generally related and should be cross-linked. For example, product items are generally related to vendor items and payment data items. Thus, the first set of rules may include a rule stating that the search result for a product item should list the vendor and payment information for that product item. Additional rules may also be included. At block 430, index engine 330 stores the indexed results into indexed database 318. At block 440, advice engine 340 reads the second set of rules from second storage 384. The second set of rules defines the actions that generally occur in association with one or more search terms. For example, if a user enters a search request for a product item, the second set of rules identifies the actions that the user will likely take after viewing the product information. The second set of rules may include a rule stating that the search result for a product item should be accompanied with an option to generate a report. At block 450, advice engine 340 retrieves data items from company database 316 and generates action advices according to second set of rules 384. At block 460, advice engine 340 stores the action advices into indexed database 318. It is to be noted that the operations of index engine 330 and advice engine 340 may be performed in any order and may be performed concurrently. The operations may be performed anytime but are generally performed when system 300 is idle or at a time when the system usage is low. Other operations may also be performed.

When system 300 is actively performing searches, rule adaptor 350 generates adaptive rules and updates some of the pre-defined rules. At block 470, rule adaptor 350 monitors the searches conducted by search engine 320, adaptively develops and refines rules that summarize the type of information in which users are typically interested. For example, if a user searching a product item often subsequently searches the last quoted price for that product, rule adaptor 350 may formulate a rule, as part of the first set of rules, to link the last quoted price to the product item. Additionally, rule adaptor 350 may formulate another rule, as part of the second set of rules, to specify an action "view last quoted price" in association with a search for that product item. At block 480, rule adaptor 350 stores these adaptive rules into search engine 320. These adaptive rules are read by index engine 330 and advice engine 340 at blocks 410 and 440, respectively, during the next system idle time or at a time when system usage is low. Other operations may also be performed.

Figure 5:
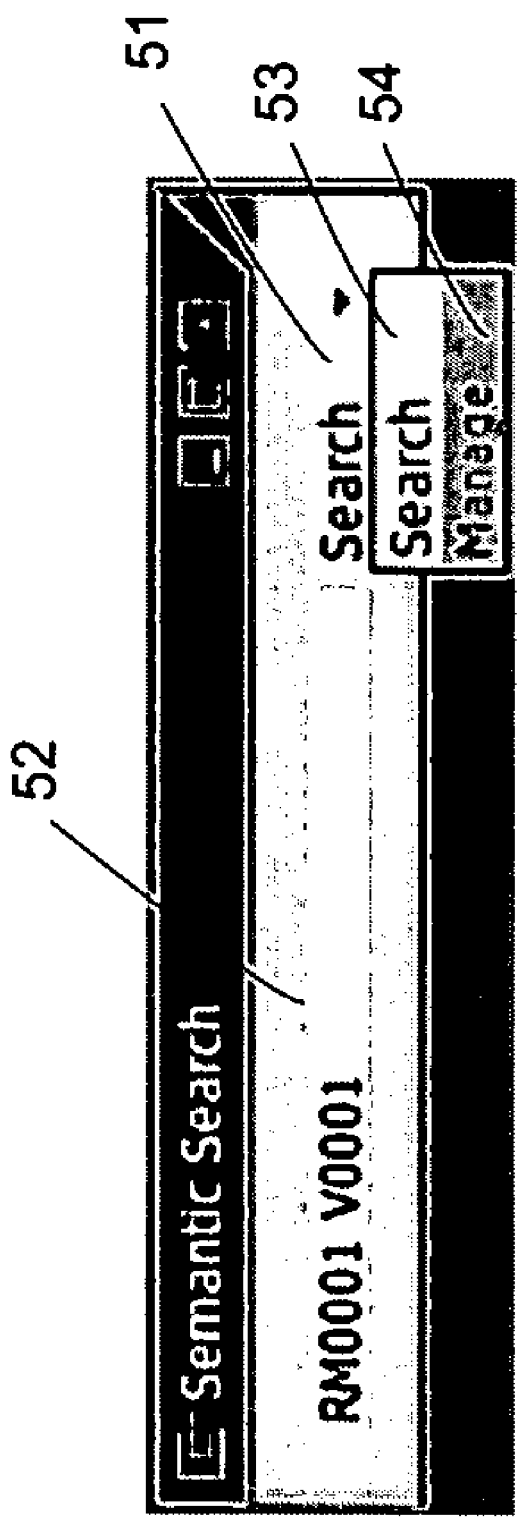
FIG. 5 is a diagram illustrating a Graphical User Interface (GUI) for a user to select a search option or a manage option according to one embodiment of the invention.

FIG. 5 is a diagram illustrating a graphical user interface (GUI) displaying the search features of system 300 according to one embodiment of the invention. Before a user starts a search, the GUI displays a dropdown list (or alternatively, a pop-up menu or a dialog box, etc.) 51 and a text editor space 52 for a user to enter search criteria. Dropdown list 510 as shown include the options of "search" 53 and "manage" 54. Additional options may be included. Each of the options in dropdown list 51 may be selected or activated to display further detailed information on the GUI. Before conducting a search, a user may select manage option 54 to specify the information entities and relationships thereof to be presented (e.g., displayed) in the search result. For example, an accountant may wish to see different types of information from a warehouse operator. Thus, the displayed results for people with different interests may be tailored to suit their needs. It is understood that the graphical components as shown are for illustration purposes only and other designs and layout may exist.

In one embodiment, an information entity defines a category of business information that includes, but is not limited to, products and parties relating to business transactions, and finance and accounting information relating to business transactions. A relationship between two or more information entities may include, but is not limited to, records relating to purchase, sales, and deliveries of business transactions. The term "relationship" indicates that the information provided therein generally involves two or more entities.

Figure 6:
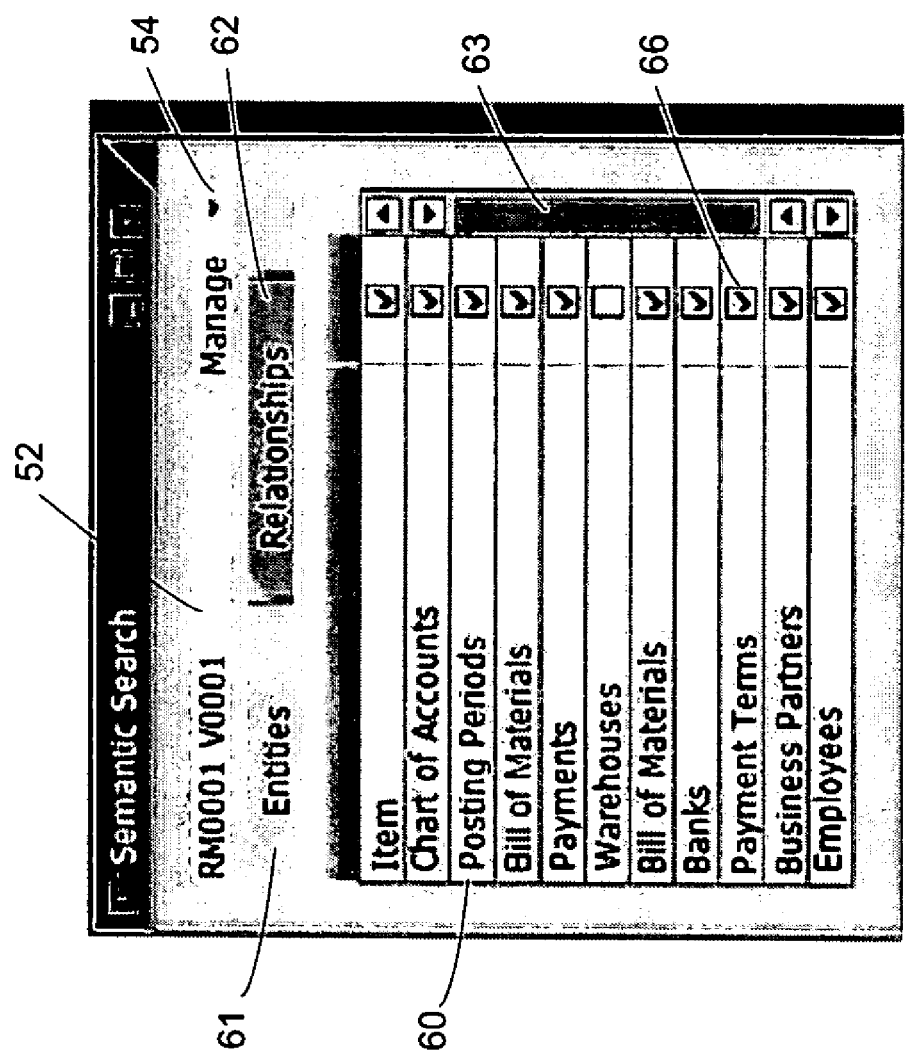
FIG. 6 is a diagram illustrating a GUI that displays a list of entities under the manage option according to one embodiment of the invention.
Figure 7:
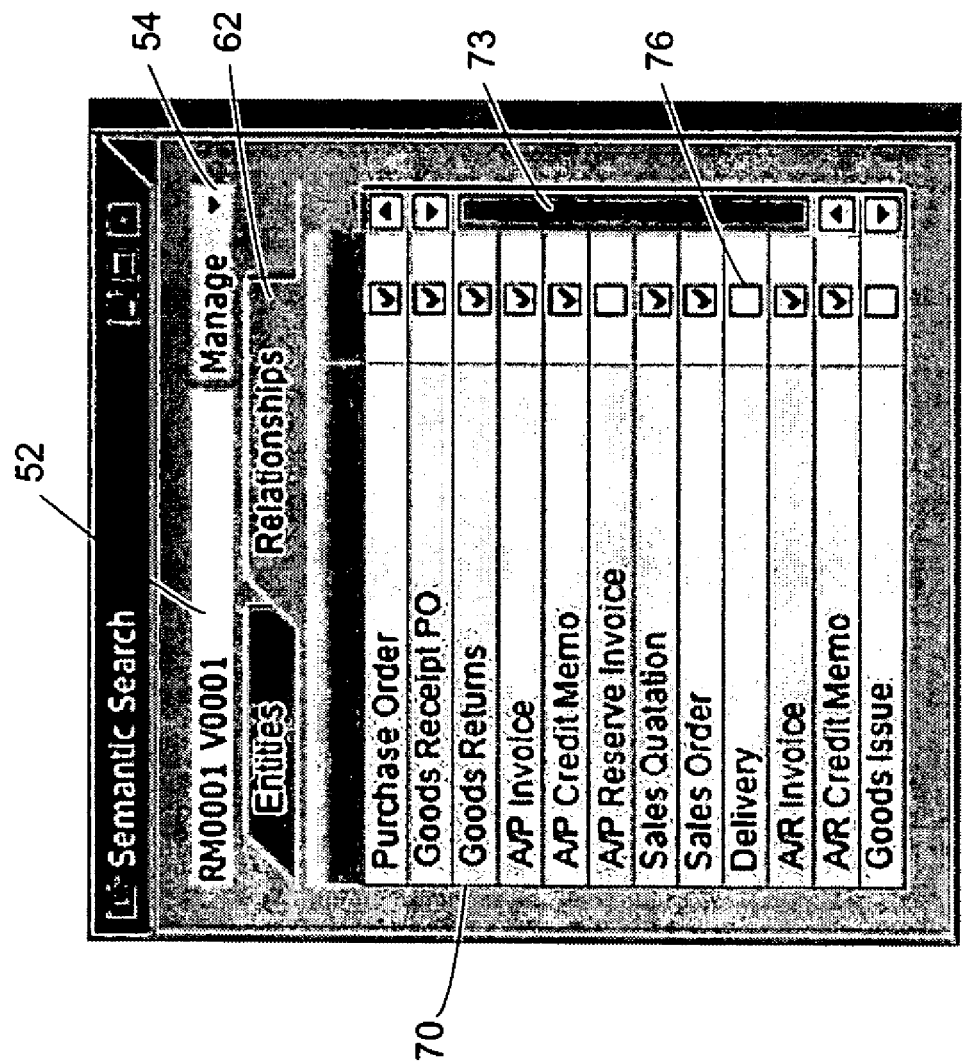
FIG. 7 is a diagram illustrating a GUI that displays a list of relationships under the manage option according to one embodiment of the invention.

Examples of the information entities and the relationship thereof are illustrated in FIGS. 6 and 7, respectively. FIG. 6 shows a GUI that displays a tab 61 labeled "entities" and a tab 62 labeled "relationships" under text editor space 52. When a user selects manage option 54 and "entities" tab 61, a set of entity categories in the form of a checklist 60 is displayed. Checklist 60 includes information entities, e.g., chart of accounts, posting periods, marketing documents, payments, warehouses, bill of materials, banks, payment terms, business partners, and employees. A scroll bar 63 indicates that additional information entities may be included and displayed when the user scrolls down checklist 60. For each category, a selector is provided for the user to indicate selection of the information entity. A selector may be a check box 66, a button, or any equivalent selecting means. Thus, a user may select the categories of information entities to be displayed in the search result. In one embodiment, checklist 60 may be user-specific. System 300 may save checklist 60 in the user's profile. Thus, checklist 60 is automatically retrieved next time the same user logs in. Again, the above list is shown for illustration purposes only and additional tabs and categories may also be included.

FIG. 7 shows another GUI of a set of relationship categories in the form of a checklist 70 according to one embodiment of the invention. Checklist 70 is displayed when a user selects manage option 54 and "relationships" tab 62. Checklist 70 includes a list of relationship categories, each defined by a relationship between two or more information entities, e.g., purchase order (PO), goods receipt PO, goods returns, account payable (A/P) invoice, A/P credit memo, A/P reserve invoice, sales quotation, sales order, delivery, account receivable (A/R) invoice, A/R credit memo, and goods issue. Other relationships may be listed when the scrolls down a scroll bar 73. For each relationship, a check box 76, a button, or any equivalent selector is provided for the user to indicate selection of that relationship category. Thus, a user may select the categories of information entities to be displayed in the search result. In one embodiment, checklist 70 may be user-specific. System 300 may save checklist 70 in the user's profile. Thus, checklist 70 is automatically retrieved next time the same user logs in. Again, the above list is shown for illustration purposes only and additional tabs and categories may also be included.

A user may start a search after checklists 60 and 70 are set up. It is contemplated that system 300 may provide a default setting if the user does not set up checklist 60 and before the search.

Figure 8:
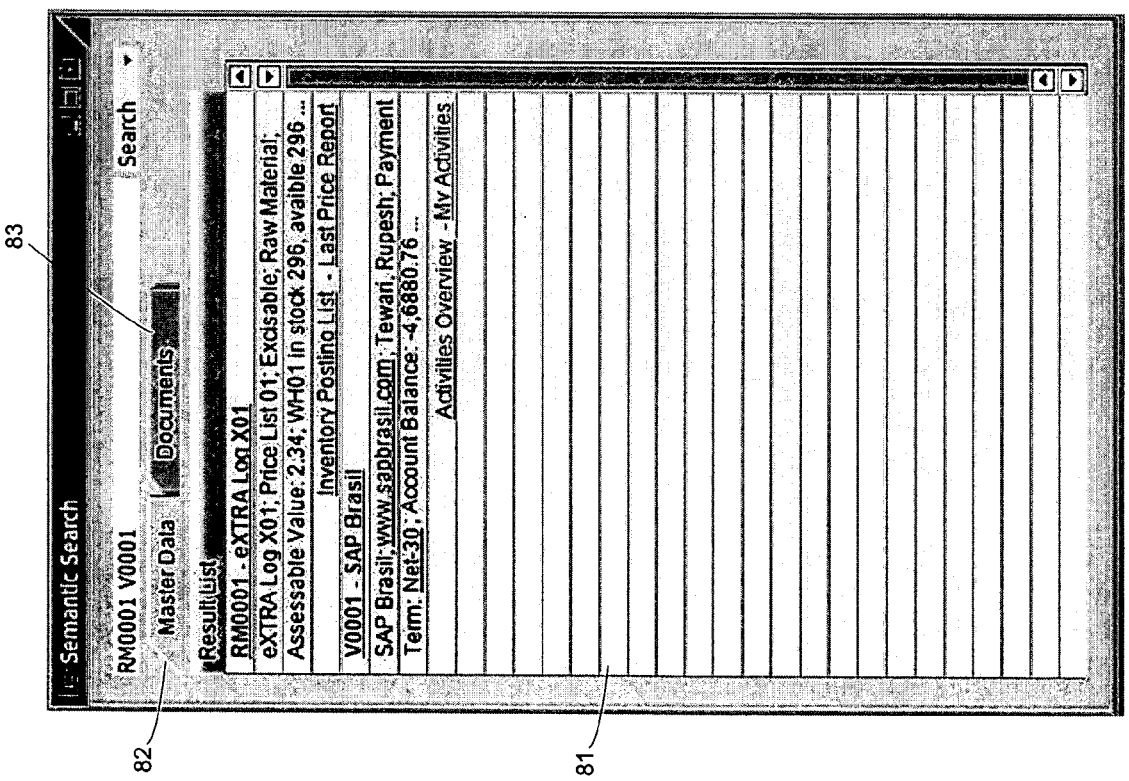
FIG. 8 is a diagram illustrating a GUI that displays search results of entities according to one embodiment of the invention.

FIG. 8 is a GUI showing a search result according to an embodiment of the invention. The search result as shown is generated after a user enters search terms of, for example, RM0001 and V0001. In this example, RM0001 represents an identifier of a product, and V0001 represents an identifier of a vendor. The GUI shows a result panel 81, which includes a plurality of tabs on the top. The tabs can be selected to show different types of the search results. In this example, the tabs include a master data tab 82 and a document tab 83. When master data tab 82 is selected, result panel 81 displays a list of entities associated with the search product and a list of entities associated with the searched vendor. More or fewer tabs may also be implemented.

Result panel 81 also displays action advice for each search term. For example, under search term RM0001, inventory posting list and last price report are presented as the action advices. Under search term V0001, activities overview and my activities are presented as the action advices. Thus, a user may select (e.g., by clicking on a mouse button) any one of the action advices to generate a desired action. Again, the display is shown for illustration purposes only and additional selections and information may also be included.

Figure 9:
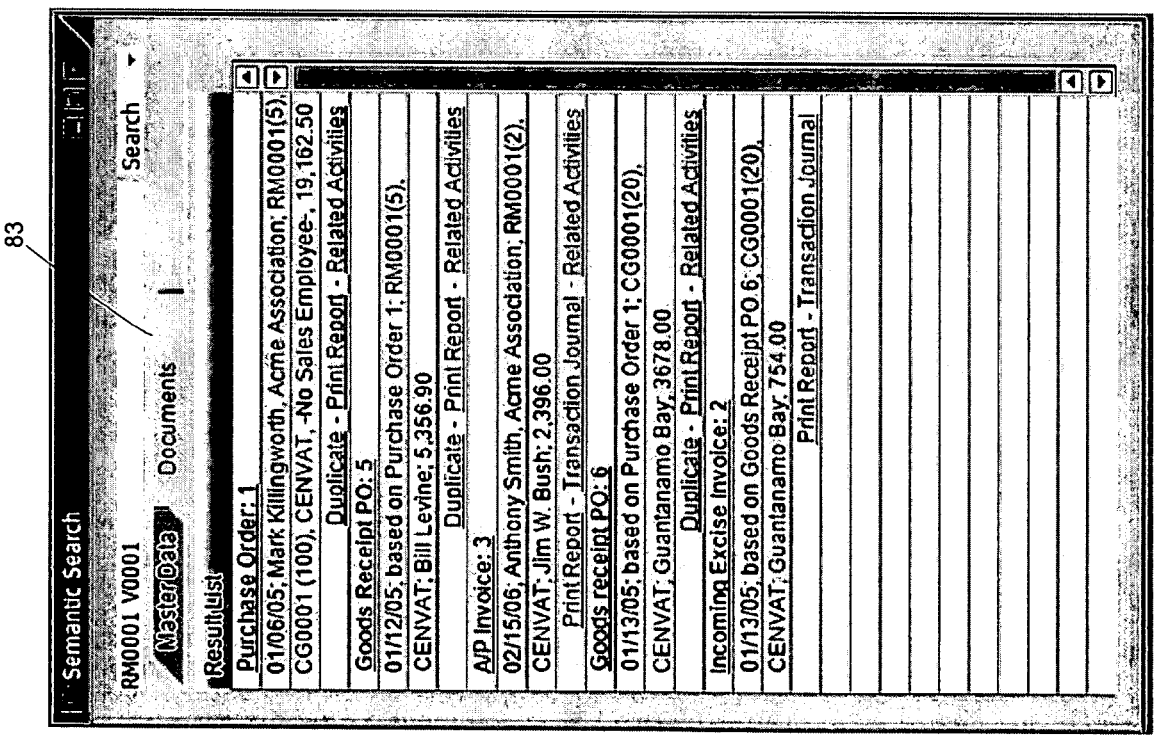
FIG. 9 is a diagram illustrating a GUI that displays search results of documents according to one embodiment of the invention.

FIG. 9 is a GUI showing a search result according to an embodiment of the invention. The search result is generated after a user enters search terms of, for example, RM0001 and V0001, and selects document tab 83. The search result includes a document in each relationship category selected in relationships checklist 70, if that document can be found in the company database. For each relationship category, a plurality of document action advices is presented. Thus, a user may select (e.g., by clicking on a mouse button) any one of the document action advices to generate a desired document or to perform a related activity. Again, the display is shown for illustration purposes only and additional selections and information may also be included.

Figure 10:
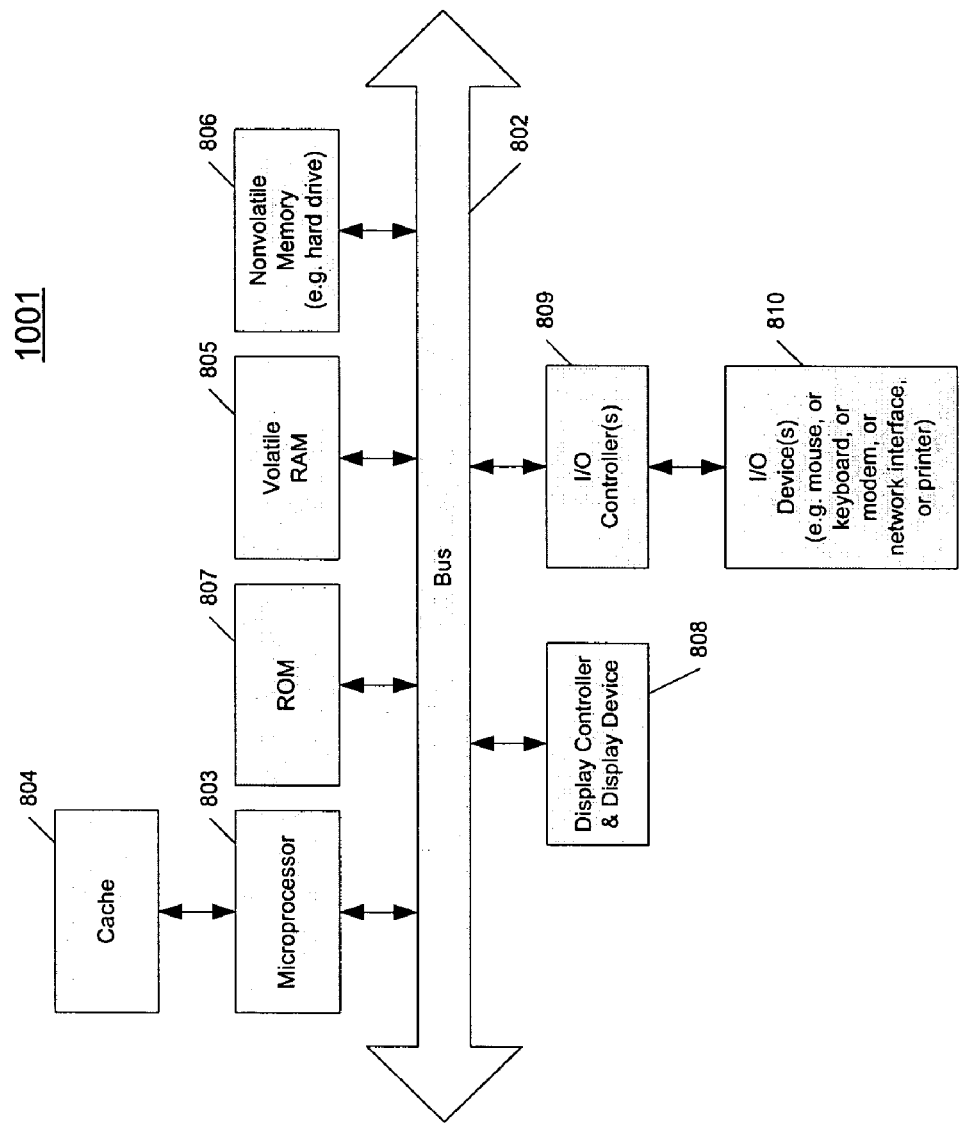
FIG. 10 is a block diagram illustrating a data processing system that may be used as an embodiment of the invention.

FIG. 10 is a block diagram of a digital processing system 1001, which may be used with one embodiment of the invention. For example, system 1001 may be used as search system 300 of FIG. 3.

Note that while FIG. 10 illustrates various components of a computer system, it is not intended to represent any particular architecture or manner of interconnecting the components, as such details are not germane to the present invention. It will also be appreciated that network computers, handheld computers, cell phones and other data processing systems which have fewer components or perhaps more components may also be used with the present invention.

As shown in FIG. 10, system 1001, which is a form of a data processing system, includes a bus or interconnect 802 which is coupled to one or more microprocessors 803 and a ROM 807, a volatile RAM 805, and a non-volatile memory 806. The microprocessor 803, which may be, for example, a PowerPC processor or an Intel Pentium processor, is coupled to cache memory 804 as shown in the example of FIG. 8. The bus 802 interconnects these various components together and also interconnects these components 803, 807, 805, and 806 to a display controller and display device 808, as well as to input/output (I/O) devices 810, which may be mice, keyboards, modems, network interfaces, printers, and other devices which are well-known in the art.

Typically, the input/output devices 810 are coupled to the system through input/output controllers 809. The volatile RAM 805 is typically implemented as dynamic RAM (DRAM) which requires power continuously in order to refresh or maintain the data in the memory. The non-volatile memory 806 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 10 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 802 may include one or more buses connected to each other through various bridges, controllers, and/or adapters, as are well-known in the art. In one embodiment, the I/O controller 809 includes a USB (Universal Serial Bus) adapter for controlling USB peripherals. Alternatively, I/O controller 809 may include an IEEE-1394 adapter, also known as FireWire adapter, for controlling FireWire devices.

Thus, a search system for a database has been described herein. Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, ABAP, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.), or a more specific form of program code that is targeted for a specific processor.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for performing a search in a database, the method comprising:
receiving a selection of relationship categories, each relationship category defining an association between at least two information entities that belong to one or more business information categories;

receiving a request that includes at least two search terms for searching the database, the search terms identifying respective information entities;

in response to the request, performing the search in the database for information relating to the information entities identified by the search terms, the search based on semantics of the search terms; and presenting a first search result responsive to the request, the first search result including a separate list of information for each of the search terms, each separate list including at least one action advice defined specifically for a corresponding business information category to which the information entity identified by the search term belongs, wherein the action advice is to be activated by input to display additional information associated with the corresponding business information category;

presenting a second search result responsive to the request, the second search result including a document in each of the relationship categories selected, each document describing the association between the information entities identified by the search terms, the second search result further including at least one document action advice specifically defined for each relationship category, wherein the document action advice is to be activated by input to process the document generated in the second search result, wherein the relationship categories include one or more of the following: purchase order, invoice, receipt, sales order, delivery and goods returns, and the business information categories include one or more of the following: chart of accounts, posting periods, payments, warehouses, bill of materials, banks, business partners, and employees.

2. The method of claim 1 further comprising:

presenting a list of business information categories to allow the user to select one or more business information categories, which are used to generate the first search result; and presenting a list of relationship categories to allow the user to select one or more relationship categories, which are used to generate the second search result.

3. The method of claim 1 further comprising:

in response to the request that includes the at least two search terms, forming rules that summarize the type of information in which the user is interested; and indexing additional data items in the database according to the rules, the additional data items to be used in future searches.

4. The method of claim 1 further comprising:

displaying a portion of the first or second search result according to a privilege level of a user that submits the request.

5. The method of claim 1, wherein the at least two search terms comprise:

an identifier of a business entity and an identifier of a product, the business entity and the product being associated with each other in the one or more transactions.

6. A machine-readable storage medium having instructions, when executed by a machine, cause the machine to perform a method for performing a search in a database, the method comprising:

receiving a selection of relationship categories, each relationship category defining an association between at least two information entities that belong to one or more business information categories;

receiving a request that includes at least two search terms for searching the database, the search terms identifying respective information entities;

in response to the request, performing the search in the database for information relating to the information entities identified by the search terms, the search based on semantics of the search terms;

presenting a first search result responsive to the request, the first search result including a separate list of information for each of the search terms, each separate list including at least one action advice defined specifically for a corresponding business information category to which the information entity identified by the search term belongs, wherein the action advice is to be activated by input to display additional information associated with the corresponding business information category; and presenting a second search result responsive to the request, the second search result including a document in each of the relationship categories selected, each document describing the association between the information entities identified by the search terms, the second search result further including at least one document action advice specifically defined for each relationship category, wherein the document action advice is to be activated by input to process the document generated in the second search result, wherein the relationship categories include one or more of the following: purchase order, invoice, receipt, sales order, delivery and goods returns, and the business information categories include one or more of the following: chart of accounts, posting periods, payments, warehouses, bill of materials, banks, business partners, and employees.

7. The machine-readable storage medium of claim 6 wherein the method further comprises:

presenting a list of business information categories to allow the user to select one or more business information categories, which are used to generate the first search result; and presenting a list of relationship categories to allow the user to select one or more relationship categories, which are used to generate the second search result.

8. The machine-readable storage medium of claim 6 wherein the method further comprises:

in response to the request that includes the at least two search terms, forming rules that summarize the type of information in which the user is interested; and indexing additional data items in the database according to the rules, the additional data items to be used in future searches.

9. The machine-readable storage medium of claim 6 wherein the method further comprises:

displaying a portion of the first or second search result according to a privilege level of a user that submits the request.

10. The machine-readable storage medium of claim 6, wherein the at least two search terms comprise:

an identifier of a business entity and an identifier of a product, the business entity and the product being associated with each other in the one or more transactions.

11. A system for performing a search in a database, the system comprising:

a processor; and a memory for storing instructions, which when executed from the memory, cause the processor to perform a method, the method including:

receiving a selection of relationship categories, each relationship category defining an association between at least two information entities that belong to one or more business information categories;

receiving a request that includes at least two search terms for searching the database, the search terms identifying respective information entities;

in response to the request, performing the search in the database for information relating to the information entities identified by the search terms, the search based on semantics of the search terms;

presenting a first search result responsive to the request, the first search result including a separate list of information for each of the search terms, each separate list including at least one action advice defined specifically for a corresponding business information category to which the information entity identified by the search term belongs, wherein the action advice is to be activated by input to display additional information associated with the corresponding business information category; and presenting a second search result responsive to the request, the second search result including a document in each of the relationship categories selected, each document describing the association between the information entities identified by the search terms, the second search result further including at least one document action advice specifically defined for each relationship category, wherein the document action advice is to be activated by input to process the document generated in the second search result, wherein the relationship categories include one or more of the following: purchase order, invoice, receipt, sales order, delivery and goods returns, and the business information categories include one or more of the following: chart of accounts, posting periods, payments, warehouses, bill of materials, banks, business partners, and employees.

12. The system of claim 11 wherein the method performed by the processor further comprises:

presenting a list of business information categories to allow the user to select one or more business information categories, which are used to generate the first search result; and presenting a list of relationship categories to allow the user to select one or more relationship categories, which are used to generate the second search result.

13. The system of claim 11 wherein the method performed by processor further comprises:

displaying a portion of the first or second search result according to a privilege level of a user that submits the request.

14. The system of claim 11, wherein the at least two search terms comprise:

an identifier of a business entity and an identifier of a product, the business entity and the product being associated with each other in the one or more transactions.

\* \* \* \* \*